United States Patent
Krause et al.

(10) Patent No.: US 10,282,360 B2
(45) Date of Patent: May 7, 2019

(54) UNIFORM CHART FORMATTING BASED ON SEMANTICS IN DATA MODELS

(71) Applicant: SAP SE, Walldorf (DE)

(72) Inventors: Gerald Krause, Bensheim (DE); Vincent Monnier, Fontenay Sous Bois (FR); Andreas Balzar, Bad Schoenborn (DE); Sihang Shao, Shanghai (CN); Jingting Fei, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/668,476

(22) Filed: Aug. 3, 2017

(65) Prior Publication Data

US 2019/0042632 A1    Feb. 7, 2019

(51) Int. Cl.
| | | |
|---|---|---|
| G06F 17/30 | (2006.01) | |
| G06F 16/248 | (2019.01) | |
| G06F 12/126 | (2016.01) | |
| G06F 12/0837 | (2016.01) | |
| G06F 17/21 | (2006.01) | |
| G06F 17/24 | (2006.01) | |
| G06Q 10/06 | (2012.01) | |
| G06T 11/20 | (2006.01) | |

(52) U.S. Cl.
CPC ........ G06F 16/248 (2019.01); G06F 12/0837 (2013.01); G06F 12/126 (2013.01); G06F 17/211 (2013.01); G06F 17/241 (2013.01); G06Q 10/06 (2013.01); G06T 11/206 (2013.01)

(58) Field of Classification Search
None
See application file for complete search history.

(56) References Cited

U.S. PATENT DOCUMENTS

| | | | | |
|---|---|---|---|---|
| 5,375,201 A | * | 12/1994 | Davoust | G06F 17/246 345/440 |
| 5,619,631 A | * | 4/1997 | Schott | G06F 3/0481 345/440 |
| 6,421,677 B1 | * | 7/2002 | Dekimpe | G06F 17/30595 |
| 8,301,993 B2 | * | 10/2012 | Matsa | G06F 17/246 345/440 |
| 8,553,039 B1 | * | 10/2013 | Boice | G06T 11/206 345/418 |
| 9,311,726 B2 | * | 4/2016 | Den Herder | G06T 11/206 |
| 2003/0131315 A1 | | 7/2003 | Escher | |

(Continued)

OTHER PUBLICATIONS

EPO Communication and Search Report for related EP Application No. 18184177.6 dated Dec. 20, 2018; 8 pages.

*Primary Examiner* — David H Chu
(74) *Attorney, Agent, or Firm* — Fish & Richardson P.C.

(57) ABSTRACT

A system for visually enhancing a chart of one or more data sets with semantic information, the data points in the data sets being values of one or more measures. The system includes a data model that specifies the one or more measures and includes measure annotations for the one or more measures. The measure annotations include semantic information of the measures. The system further includes a processor that executes instructions stored in the memory to implement a chart component. The chart component renders data points of the one or more data sets in a chart, and visually enhances the chart with semantic information of the one or more measures retrieved from the data model.

17 Claims, 9 Drawing Sheets

(56) References Cited

U.S. PATENT DOCUMENTS

| | | | | |
|---|---|---|---|---|
| 2003/0154443 A1* | 8/2003 | Papierniak | ........... | G06T 11/206 715/211 |
| 2006/0036964 A1* | 2/2006 | Satterfield | ............. | G06F 3/0481 715/777 |
| 2006/0059439 A1* | 3/2006 | Hao | ...................... | G06T 11/206 715/805 |
| 2009/0024411 A1* | 1/2009 | Albro | .................... | G06F 19/322 705/2 |
| 2009/0033664 A1* | 2/2009 | Hao | ...................... | G06T 11/206 345/440 |
| 2009/0096812 A1* | 4/2009 | Boixel | .................. | G06Q 10/00 345/646 |
| 2012/0047090 A1* | 2/2012 | Gunther | ................ | G06Q 40/06 705/36 R |
| 2013/0038612 A1* | 2/2013 | Hanumara | ............ | G06Q 30/02 345/440 |
| 2013/0124965 A1 | 5/2013 | Elias et al. | | |
| 2014/0104279 A1* | 4/2014 | Albrecht | ............. | G01C 21/367 345/440 |
| 2014/0157170 A1 | 6/2014 | Elias | | |
| 2014/0340407 A1* | 11/2014 | Perez | ................... | G06T 11/206 345/440.2 |
| 2015/0040052 A1 | 2/2015 | Noel et al. | | |
| 2015/0228097 A1* | 8/2015 | Matange | ............... | G06T 11/206 345/440 |
| 2015/0381515 A1* | 12/2015 | Mattson | ............... | H04L 41/145 707/609 |
| 2016/0148118 A1* | 5/2016 | Venkateswarulu | ........................ | G06F 11/0793 706/12 |
| 2016/0224920 A1 | 8/2016 | Doms | | |
| 2016/0350950 A1* | 12/2016 | Ritchie | ................. | G06T 11/206 |
| 2017/0004638 A1* | 1/2017 | Csenteri | ............... | G06T 11/206 |
| 2018/0165851 A1* | 6/2018 | Apte | ...................... | G06T 11/60 |

\* cited by examiner

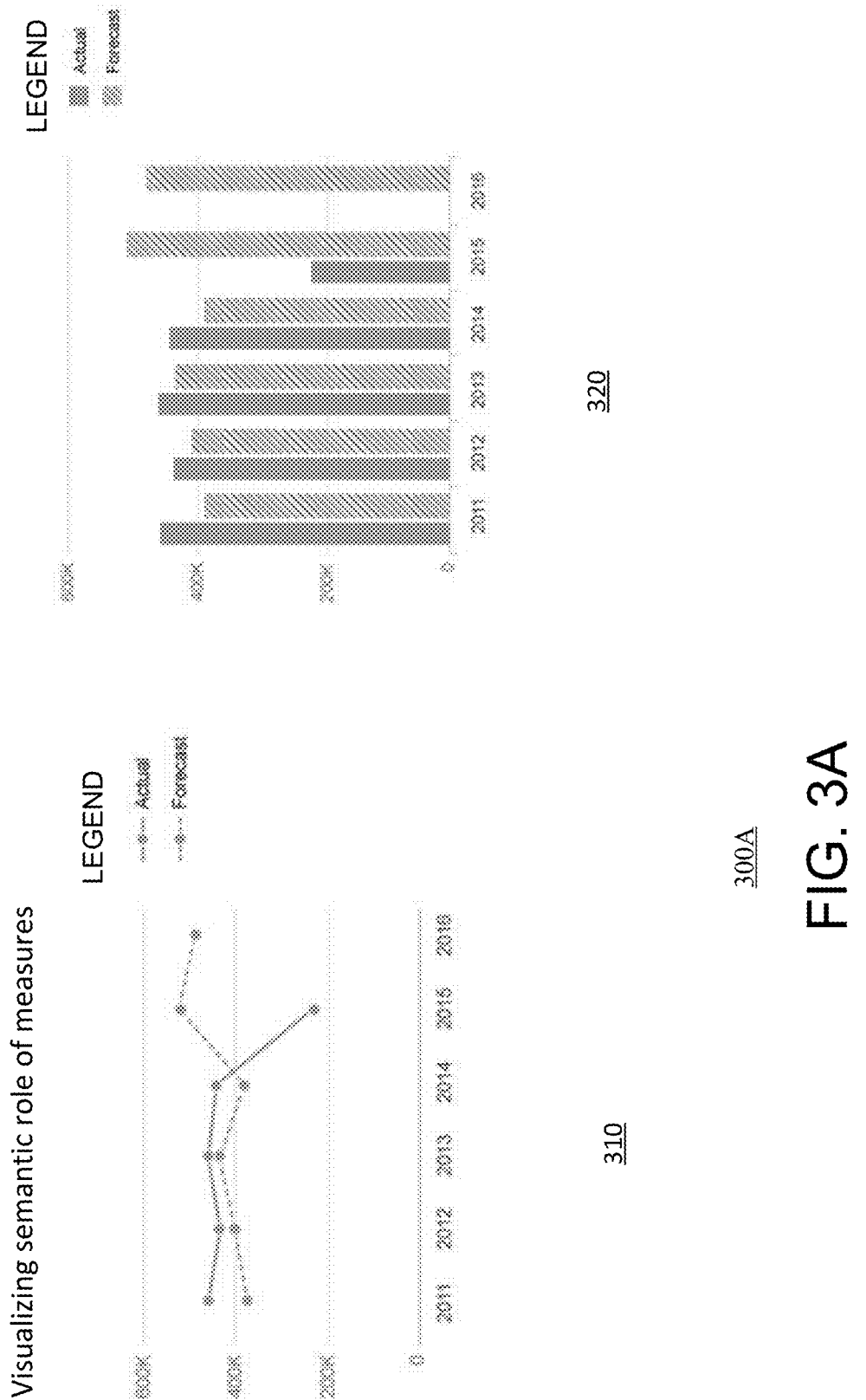

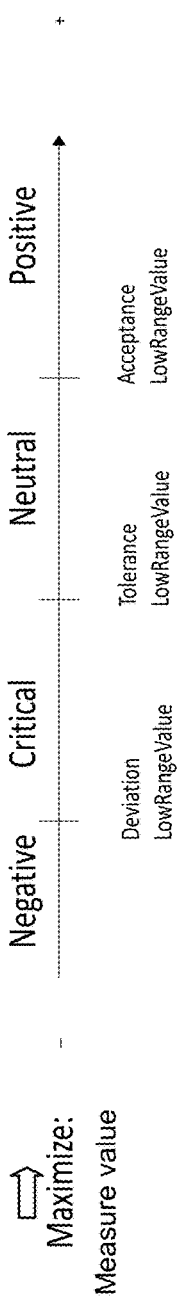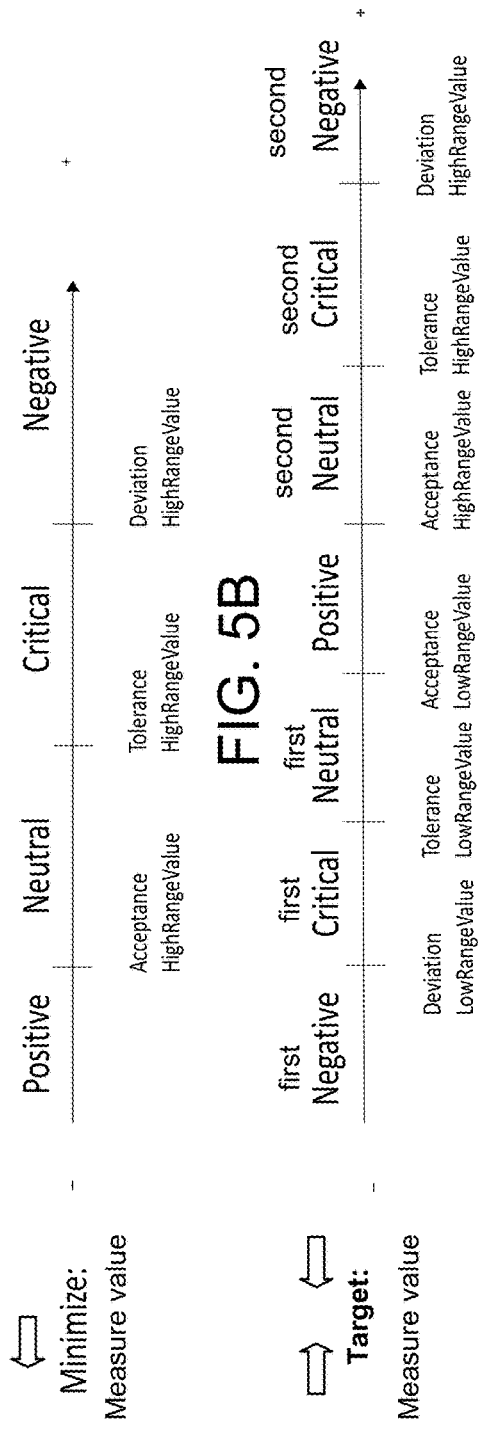
FIG. 5A
FIG. 5B
FIG. 5C

UNIFORM CHART FORMATTING BASED ON SEMANTICS IN DATA MODELS

BACKGROUND

A graph or chart is a diagrammatical illustration of a set of data. Graphs and charts can be used to convey important information, such as numeric quantities, trends and relationships between values. A graph or chart may allow a viewer to quickly grasp comparisons and trends more easily than looking at the raw data. Graphs and charts are of many types. Some of the most common types of graphs and charts include: bar graph, stacked bar chart or relative value chart, clustered bar chart, histogram, line graph, pie chart, area chart, Venn diagram, scatter plot, etc. It may be important to choose the right type of graph or chart to easily and accurately convey information.

Data (e.g., data generated by a business application or a scientific application) which may be of interest to a user, may be stored, for example, in a spreadsheet, a SQL database, Hadoop, or the cloud. Users may need to create a graph or chart to visually represent data (e.g., for display on a computer screen or to include in a report or presentation). Creating suitable graphs or charts usually requires considerable development effort by users. A user may have to individually analyze the data, and select proper variables and scales to properly format the graphs or charts. Further, there can be user-to-user variations and inconsistencies in the graphs or charts created by different users. In the context of data (e.g., data generated by business applications) that is viewed or analyzed by a large number of different users, the user-to-user variations and inconsistencies in the graphs or charts created by different users can be problematic.

Consideration is now being given to systems and methods for uniform chart formatting and annotation.

SUMMARY

Systems and methods for visually enhancing a chart of one or more data sets with semantic information are described herein. The data points in the data sets are values of one or more measures.

In a general aspect, a system includes a data model, a processor and a memory. The data model includes specifications of the one or more measures and measure annotations for the one or more measures. The measure annotations include semantic information of the measures. The processor executes instructions stored in the memory to implement a chart component. The chart component renders the data points of the one or more data sets in a chart, and visually enhances the chart with semantic information of the one or more measures retrieved from the data model.

In a general aspect, a computer-implemented method includes providing, a data model that includes specifications of the one or more measures and measure annotations for the one or more measures. The measure annotations including semantic information of the measures. The method further includes accessing, with a chart component, the data model and a data source containing the one or more data sets, and using the chart component to render data points of the one or more data sets in the chart and visually enhance the chart with semantic information of the one or more measures retrieved from the data model.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

FIG. 3A is an illustration of an example chart that has been formatted and annotated by a UI chart component to visualize semantic roles, in accordance with the principles of the present disclosure.

FIG. 5A is an illustration of "positive," "neutral," "critical," and "negative" ranges of a measure with an improvement direction "maximize," in accordance with the principles of the present disclosure.

FIG. 5B is an illustration of "positive," "neutral," "critical," and "negative" ranges of a measure with an improvement direction "minimize," in accordance with the principles of the present disclosure.

FIG. 5C is an illustration of "positive," "neutral," "critical," and "negative" ranges of a measure that are defined in terms of fixed measure values, in accordance with the principles of the present disclosure.

DETAILED DESCRIPTION

For convenience in description, the terms "chart," "graph," "diagram," or "figure" (or any other term for a visual or graphic representation of data) may be referred to herein as a "chart". A chart may be a visual presentation of data points in a data set. The data points may be values of a data variable or item. A data variable or item may be a named reading (e.g., a sensor reading, the current location of a vehicle (latitude, longitude, and altitude coordinates), the available memory on a computer, etc.). Data item values may be values in a sequence or series (e.g., hourly temperatures, odometer readings, or daily usage statistics, annual revenue, monthly costs, etc.). A data item that has numeric values may be referred to herein as a "measure" or a "measure item."

A chart may be a visual or graphical representation of a data set in a data source. The data set underlying the chart may, for example, be data that is generated or consumed by a computer application (e.g., a business application, a scientific application, etc.) The data set underlying the chart may be stored, for example, in a spreadsheet, a SQL database, Hadoop, or the cloud, etc. Charts are often used to ease understanding of large quantities of data and the relationships between parts of the data. Charts can usually be read more quickly than the raw data. A chart may be displayed on a user interface of a client computing device or may be embedded in a document (e.g., a report).

Computer-implemented methods and systems for uniformly formatting and annotating charts that visually represent data sets are described herein, in accordance with the principles of the present disclosure.

The data sets underlying a chart may include data conforming to a data model that includes semantic information describing properties or characteristics of the data sets. The methods and systems described herein may utilize the semantic information or description stored in the data model for the automated formatting and annotation of charts of the data sets.

An example data model describing properties or characteristics of the data sets may be constructed using a data modeling language (e.g., Data Format Description Language (DFDL), which is a modeling language for describing general text and binary data in a standard way; Data Manipulation Language (DML); Data Definition Language (DDL), etc.). The data model of the data sets may be enriched by information about criticality, semantic roles and semantic relations between data items (e.g., measures) in the data source.

Figure 1:
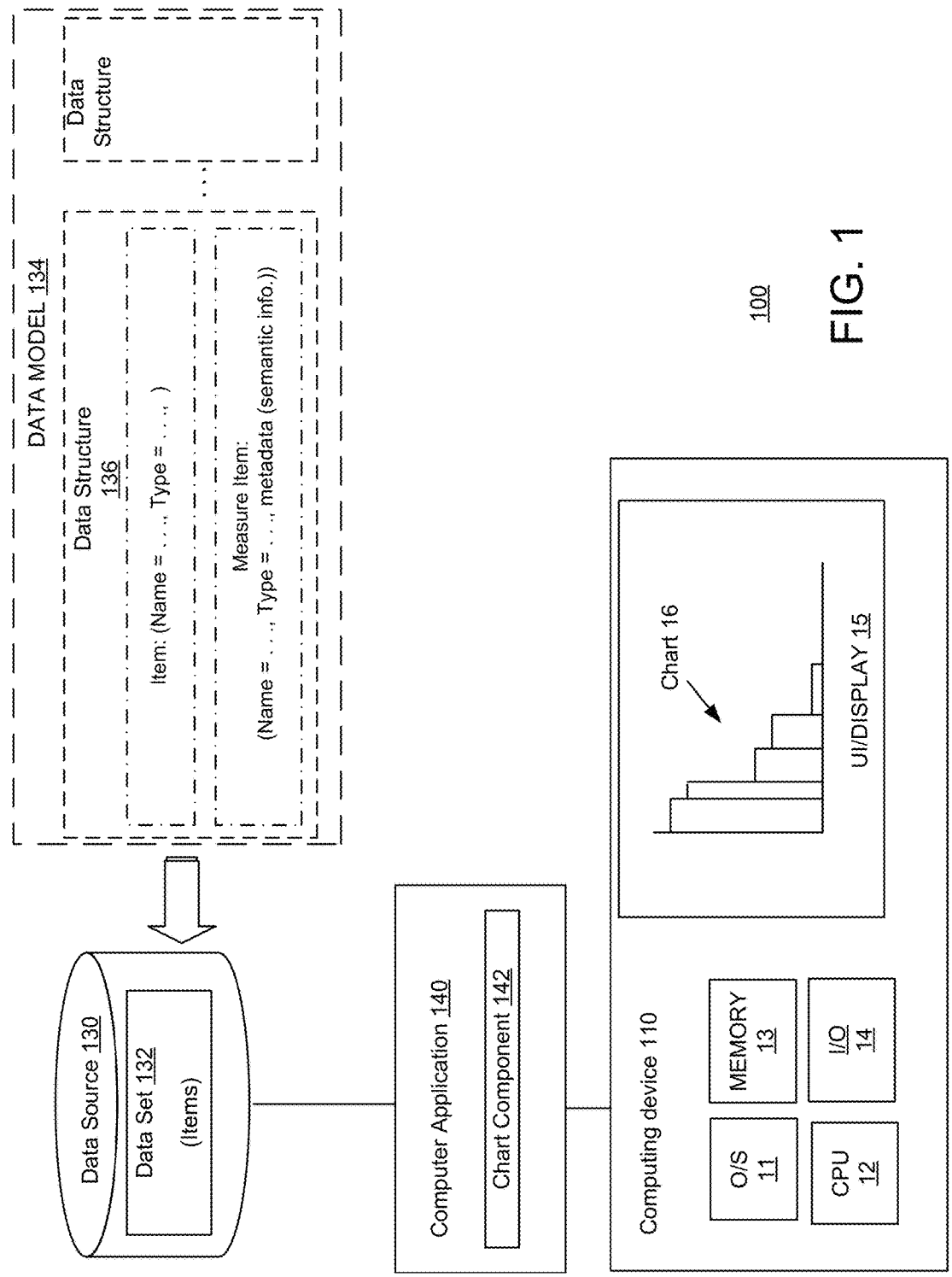
FIG. 1 is a schematic block diagram illustration of an example system that is configured for uniform formatting and annotation of a chart, in accordance with the principles of the present disclosure.

FIG. 1 shows an example system 100 that is configured for uniform formatting and annotation of a chart, in accordance with the principles of the present disclosure.

System 100 may include a computer application 140 (e.g., a business application) coupled to a data source (e.g., data source 130). The data source may include one or more data sets (e.g., data sets 132) that are to be rendered as a chart. Computer application 140 may include one or more charting modules (e.g., a chart component) for creating a chart based on the one or more data sets (e.g., data sets 132) in the data source (e.g., data source 130).

In an example implementation, computer application 140 may include, or be coupled to, a chart component 142 that includes functions for automated formatting of the charts created by the computer application, in accordance with principles of the disclosure herein.

In system 100, computer application 140 and chart component 142 may be hosted on one or more standalone or networked physical or virtual computing machines. FIG. 1 shows, for example, computer application 140 and chart component 142 hosted on a computing device 110 (e.g., a desktop computer, a mainframe computer, a personal computer, a mobile computing device, a laptop, a tablet, or a smart phone), which may be available to a user. Computing device 110, which includes an O/S 11, a CPU 12, a memory 13, and I/O 14, may further include or be coupled to a display 15.

In an example implementation, computer application 140 have a front end user interface (UI) for displaying charts (e.g., chart 16) on display 15 of computing device 110. In some implementations, computer application 140 may include document editing features that allow a chart object created by the computer application 140/chart component 142 to be embedded in a document.

Moreover, although computing device 110 is illustrated in the example of FIG. 1 as a single computer, it may be understood that computing device 110 may represent two or more computers in communication with one another. Therefore, it will also be appreciated that any two or more components 110-140 of system 100 may similarly be executed using some or all of the two or more computing devices in communication with one another. Conversely, it also may be appreciated that various components illustrated as being external to computing device 110 may actually be implemented therewith.

Chart component 142 may be configured to render data points in the one or more data sets (e.g., data sets 132) as a chart (e.g., chart 16) and use semantic information related to the data sets in formatting the chart (e.g., chart 16) of the data points in the data sets. The chart (e.g., chart 16) and the data source (e.g., data source 130) may be located in the same computer system (e.g., computing device 110 or on different computer systems. The semantic information may be included in a data model (e.g., data model 134) of the data sets.

In an example implementation, data model 134 may include specification or definition of one or more data structures (e.g., data structure 136). Each data structure may include specification of a data item (e.g., name, data type, other description, etc.) of the data in a data set. The name assigned to a data item in the data structure may make the item addressable. The data type assigned to a data item in the data structure may enable computer processing of the item. The data type may define a particular kind of data item by the values the data item can take, the programming language used, or the operations that can be performed on the data item. Example of data types may include integers, Booleans, characters, floating-point numbers, complex numbers, text, alphanumeric strings, arrays, matrices, combination data types, etc. Some of the items (hereinafter "measures' or "measure" items) included in some data structures may have numeric values. For example, a revenue measure item may provide numeric revenue values. Data points in the chart may be visualizations of items with numeric values (i.e., measure items) included in some data structures.

In addition, the specification or definition of one or more data structures (e.g., data structure 136 in data model 134) may include metadata information. The metadata may include "semantic" information about criticality, semantic roles and semantic relations between measures. This metadata including the semantic information may be referred to herein as the "metadata annotation" (or "measure annotation") of the data item or measure.

The data source (e.g., data source 130) may provide chart component 142 access to the entities in the data model (e.g., data model 134).

One or more data items in a data structure (e.g., data structure 136) may be used by chart component 142 as a measure item for formatting the chart (e.g., chart 16). Chart component 142 may render data points provided by the data source in a chart. Data points are visualizations of items with numeric values, so-called measures, included in some data structures. Data points rendered by chart component 142 in the chart (e.g., chart 16) may be based on numeric measures (e.g., "revenue"). In example implementations, chart component 142 may render the data points in a chart (e.g., chart 16) in different categories (e.g., as revenue per product). In some implementations, chart component 142 may render the data points in the chart (e.g., chart 16) as a series or collection of multiple items (e.g., revenue per product for multiple customers).

As noted previously, the semantic information (i.e. measure annotation) may be included in the data model of the data source consumed by the chart component. The semantic information may be added to the data model, for example, by annotating the relevant measures in the data structures of the data model (e.g., by using a language construct of the data modeling language of the data model).

In example implementations, charts (e.g., in business systems) created using the computer-implemented methods and systems disclosed herein may expose relevant semantics of the data points in the charts. Chart component 142 may be configured to automatically format and annotate the chart based on semantic information retrieved from the data model.

Chart component 142 may automatically apply an enhanced format to data points in a chart to highlight or visualize the semantic information in the chart. The chart can be of any chart type (e.g., column, bar, line, stacked column, stacked bar, bullet, heat map chart type, etc.).

Example Semantics Used by the Chart Component 142 to Format Charts

Example semantics of the data points may include "criticality" semantics of data points. The criticality of data points may be an assessment of the data points (measure values) in a data set as being in one or more criticality categories (e.g., a "positive", a "critical", a "neutral", or a "negative" category; or "available", "inspection" or "blocked" category; etc.). The criticality information of the data points may be included in the data model, for example, as metadata annotation. Chart component 142 may be configured to automatically highlight or visually enhance the data points in the chart based on the criticality information of the data points derived from the data model.

Figure 2:
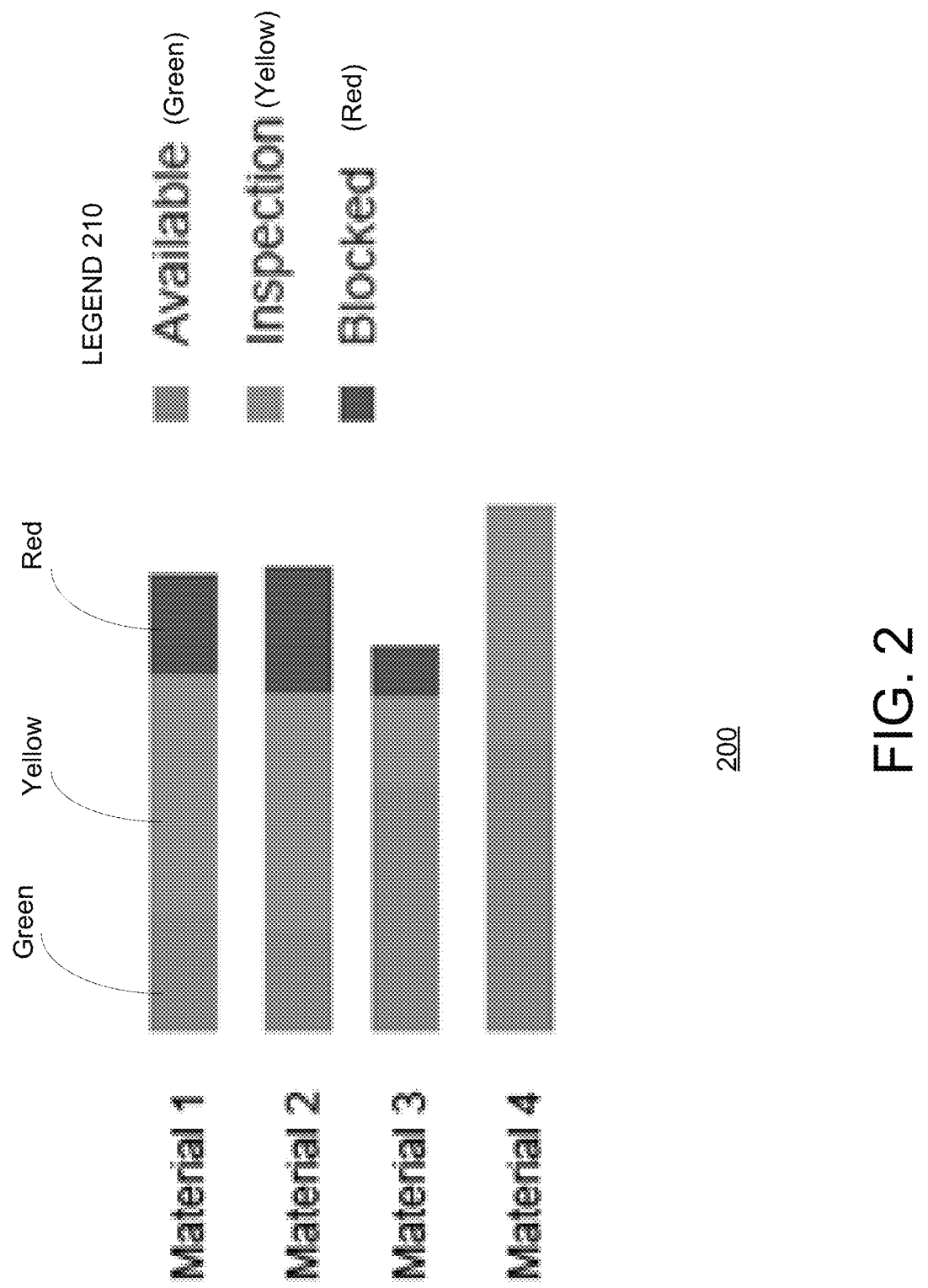
FIG. 2 is an illustration of an example chart that has been formatted and annotated by a user-interface (UI) chart component using criticality information of data points included in a data model, in accordance of the principles of the present disclosure.

FIG. 2 shows, for example, a chart 200 that has been automatically formatted by chart component 142 using criticality information of the data points included in the data model, in accordance of the principles of the present disclosure. Chart 200 shows values of four data items (e.g., Material 1, Material 2, Material 3 and Material 4) as a horizontal bar graph. Using criticality information (e.g., available, inspection and blocked category), chart component 142 may automatically format (e.g., color code) the bars depicting each of the four materials, for example, by color coding the data points according to the criticality categories that the data points belong to. Chart component 142 may also annotate the chart with a legend 210 that visually depicts the correspondence of the different criticality categories and the color code.

As another example, the semantics of the data points may include a semantic role of measure items. A measure item may be a record of a real-world business quantity or variable (e.g., profit per year, revenue, etc.). The semantic role of a measure item may, for example, describe or characterize how the measure item should be viewed. For example, the semantic role may describe that the measure item should be viewed as an actual value, or a projected value (e.g., a forecasted, estimated, or predicted value), or a reference value (e.g., a threshold or target value).

Chart component 142 may be configured to automatically format a chart by using dedicated graphical patterns and or colors to visualize the semantic roles of the measures (on which the data points are based). Chart component 142 may also annotate the chart with legends visualizing the different semantic roles and corresponding graphical patterns and or colors.

FIG. 3A shows an example chart 300A that has been automatically formatted by chart component 142 to visualize semantic roles, in accordance with the principles of the present disclosure. Example chart 300A includes both a line graph 310 and a column graph 320 of two measures—actual and projected. As shown in the figure, chart component 142 may visualize the semantic roles by rendering the projected measure with dashed lines (in line graph 310) or hatched areas (in column graph 320), while rendering actual measures with a solid line (in line graph 310) or solid pattern boxes (in column graph 320). Chart component 142 may also annotate the chart with legends (312, 322) visualizing the different semantic roles and corresponding graphical patterns—dashed lines, hatched areas, solid lines or solid pattern boxes.

Figure 3B:
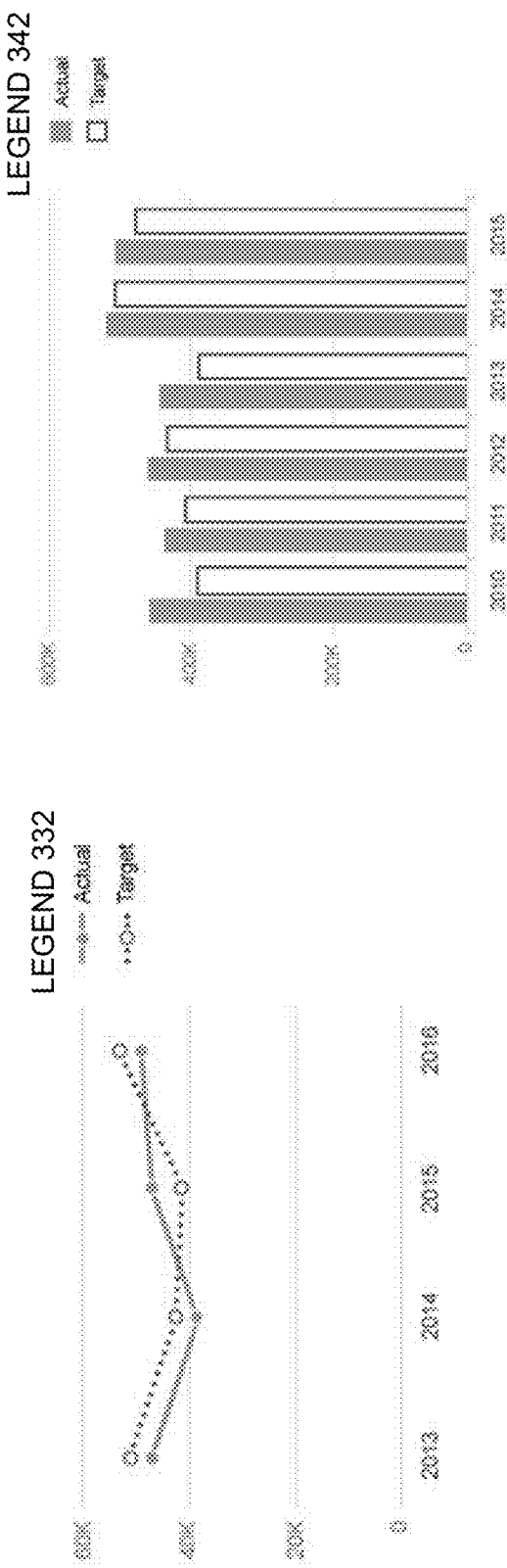
FIG. 3B is an illustration of another example chart that has been formatted and annotated by a UI chart component to visualize semantic roles, in accordance with the principles of the present disclosure.

FIG. 3B shows another example chart 300B that has been automatically formatted by chart component 142 to visualize semantic roles, in accordance with the principles of the present disclosure. Example chart 300B includes both a line graph 330 and a column graph 340 of two measures—actual and target (or reference). As shown in the figure, chart component 142 may visualize the semantic roles by rendering reference measures with dotted lines (in line graph 330) or empty boxes (in column graph 340), while rendering actual measures with a solid line or solid pattern boxes. Chart component 142 may also annotate the chart with legends (332, 342) visualizing the semantic roles and corresponding graphical patterns—dotted lines, empty boxes, solid lines or solid pattern boxes.

As another example, the semantics of the data points may include relations between measures. Different measures shown as data points in a chart may be related to each other. For example, the different measure representing the same real-world variable (e.g., profit per year), but having different semantic roles, may be related to each other. Consider the case where a chart includes data points for three related measures—actual revenue, forecasted (projected) revenue, and target (reference) revenue. In such a case, chart component 142 may obtain semantic information from measure annotations in data model 134 on the relations between the three measures. Chart component may use the sematic information to automatically format the chart to visually highlight the relations between the three measures.

Figure 4:
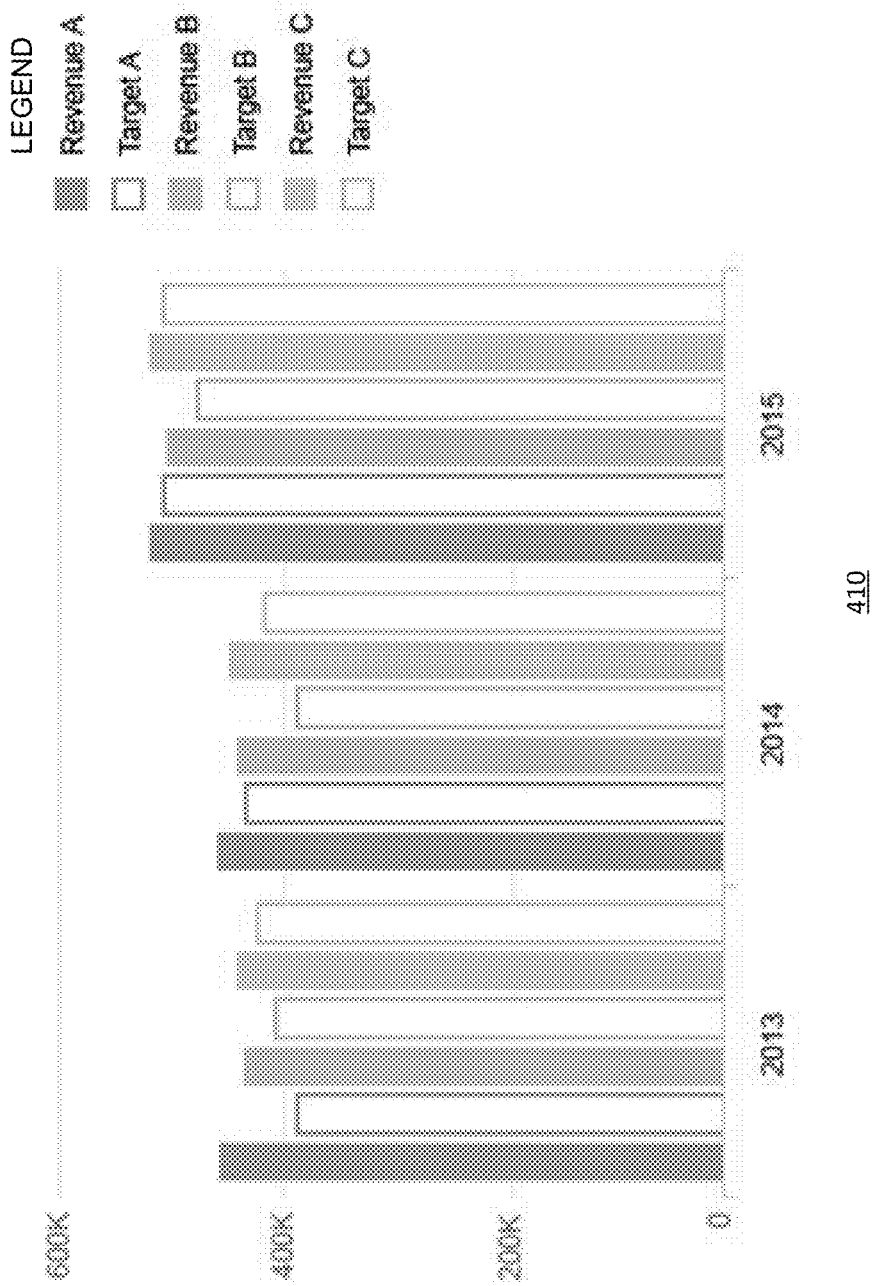
FIG. 4 is an illustration of an example chart that has been formatted and annotated by a UI chart component to visualize semantic relations between two measures, in accordance with the principles of the present disclosure.

FIG. 4 shows an example chart 410 that has been automatically formatted by chart component 142 to visualize semantic relations between three pairs (A, B, and C) of two measures (e.g., revenue and target), in accordance with the principles of the present disclosure.

Example chart 410 includes a column graph showing values of three pairs (A, B, C) of two measures (i.e., actual revenue and target revenue). As shown in the figure, chart component 142 may visualize the semantic relations between the two measures by rendering the actual revenue measure with a solid pattern in columns while rendering the target revenue measure with an open box pattern in columns across the three pairs A, B and C.

Example Measure Annotation: Criticality Semantics

As noted previously, criticality of a measure is an assessment of the measure values as being in one or more criticality categories. In an example implementation, criticality assessment may result in categorization of measure values as being in one of several criticality categories (e.g., "positive," "critical," "neutral," or "negative" criticality categories). The criticality of a data point in a chart may be determined (e.g., chart component 142) by determining whether the data point (i.e., measure value) is within pre-defined category boundaries or thresholds, and or by a calculation taking further business context into consideration.

As an example of pre-defined category boundaries, a measure (e.g., sensor temperature) may be considered to be in the positive category if the measure value is within +/−10% of a target value, in the critical category if the measure value is within +/−25% of the target value, and in the negative category if the measure value is outside +/−25% of the target value.

As an example of a calculation taking further business context into consideration determining the criticality of a data point in a chart, consider an example measure (e.g., a number of service outages of a utility). In an example scenario, a definition of what is a service outage and thus the count of number of service outages depends on customer-utility contractual agreements, which may vary from customer to customer. In such a scenario, the criticality of number of service outages may depend on the business context (i.e., the customer-utility contractual agreements, which may vary from customer to customer).

In an example implementation, the criticality of a measure may be a static criticality category, and may be defined as such in the measure annotation in the data model.

In an example implementation, the criticality of a measure may be defined in the data model as being based on threshold values. The thresholds may be fixed thresholds or dynamic thresholds.

Fixed Criticality Thresholds

In an example of criticality based on fixed thresholds, a measure annotation in the data model may, for example, include an "improvement direction" (e.g., maximize, or minimize, or target) in addition to threshold or boundary values of "positive," "critical," "neutral," and "negative" category ranges for the measure.

The improvement direction may refer to the direction in which measure values should change, for example, to be in the positive criticality range (assuming that the positive criticality is preferable over the negative criticality). The direction may be determined, for example, from a business context or other context of the measure.

For example, for a measure such as revenue, the improvement direction may be set as "maximize" to indicate the direction in which measure values should change to be in the positive criticality category range.

FIG. 5A schematically shows the "positive," "neutral," "critical," and "negative" category ranges of a measure with an improvement direction "maximize," in accordance with the principles of the present disclosure.

In FIG. 5A, the threshold or boundary between the negative and critical category ranges is shown as being set, for example, to "DeviationLowRangeValue," the threshold or boundary between the critical and the neutral category ranges is shown as being set, for example, to "ToleranceLowRangeValue," and the threshold or boundary between the neutral and the positive category ranges is shown as being set, for example, to "AcceptanceLowRangeValue."

Further, for a measure such as costs, the improvement direction may be set as "minimize" to indicate the direction in which measure values should change to be in the positive criticality category range.

FIG. 5B schematically shows the "positive," "neutral," "critical," and "negative" category ranges of a measure with an improvement direction "minimize," in accordance with the principles of the present disclosure. In FIG. 5B, the threshold or boundary between the positive and neutral ranges is shown as being set, for example, to "AcceptanceHighRangeValue," the threshold or boundary between the neutral and the critical ranges is shown as being set, for example, to "ToleranceHighRangeValue," and the threshold or boundary between the critical and the negative ranges is shown as being set, for example, to "DeviationHighRangeValue."

For some measures (e.g., sensor temperature discussed above), the improvement direction may be set to "target" to indicate the existence of a target range in which the measure values should be in order to be in the positive criticality category range. Conversely, for some other measures the improvement direction may be set as "negative target" to indicate the existence of a target range in which the measure values are in the negative criticality category range.

FIG. 5C schematically shows the "positive," "neutral," "critical," and "negative" category ranges of a measure with an improvement direction "target", in accordance with the principles of the present disclosure. In FIG. 5C, the threshold or boundary between the first negative and first critical ranges is shown as being set, for example, to "DeviationLowRangeValue," the threshold or boundary between the first critical and the first neutral ranges is shown as being set, for example, to "ToleranceLowRangeValue," and the threshold or boundary between first neutral and the positive ranges is shown as being set, for example, to "AcceptanceLowRangeValue," the threshold or boundary between the positive and second neutral ranges is shown as being set, for example, to "AcceptanceHighRangeValue," the threshold or boundary between the second neutral and the second critical ranges is shown as being set, for example, to "ToleranceHighRangeValue," and the threshold or boundary between the second critical and the second negative ranges is shown as being set, for example, to "DeviationHighRangeValue."

Dynamic Criticality Thresholds

In some implementations, the measure annotation for a subject measure in the data model may not contain fixed criticality thresholds for chart component 142 to use when automatically formatting a chart. Instead, chart component 142 may be configured to dynamically compute the criticality thresholds for automatically formatting a chart for the subject measure. The criticality thresholds for the subject measure may be statistically computed, for example, with reference to the criticality thresholds for one or more other "reference" measures in the data model. The one or more other reference measures may be in the same data structure as the subject measure. In such implementations, the measure annotation in the data model for a subject measure may include an improvement direction (e.g., maximize, minimize, or target) in which measure values should change to be, for example, in a positive criticality range.

The measure annotation in the data model for the subject measure may further include names of the one or more other reference measures. The threshold or boundary values (e.g., AcceptanceRangeLowValueItem, AcceptanceRangeHighValueItem, ToleranceRangeLowValueItem, ToleranceRangeHighValueItem, DeviationRangeLowValueItem, and DeviationRangeHighValueItem) between the different criticality categories (e.g., positive, neutral, critical and negative categories) may be computed with reference to the one or more other reference measures.

An example measure annotation in the data model for subject measure (e.g., revenue) may, for example, be:

```
Datastructure: {
    ...
    @ImprovementDirection: Maximize
    @DeviationRangeLowValue: BreakEvenPoint
    Item Revenue Type Decimal
    ...
    Item BreakEvenPoint Type Decimal
}.
```

It is noted that the boundary values between the different category ranges in the case of the dynamic criticality thresholds may be set in the same manner and based on the same principles as in the case of fixed criticality thresholds (described above with reference to FIGS. 5A-5C). However, unlike the case of fixed criticality thresholds, in the case of the dynamic criticality thresholds, the boundary values are not merely fixed values, but are also part of the data model.

Calculated-by-Reference Criticality:

In some implementations, a measure annotation may include the name of another item in the same data structure as the subject measure to be assessed. The another item may hold the criticality category for the subject measure. A value of the another item may be one of the criticality categories. An example of such a measure annotation may, for example, be:

```
Datastructure: {
    ...
    @CalculatedCriticality: RevenueCriticality
    Item Revenue Type Decimal
    ...
    Item RevenueCriticality Type CriticalityEnumeration
}.
```

The foregoing measure annotation for the subject measure (e.g., item: revenue) includes the name of another item (e.g., item: RevenueCriticality) in the same data structure the subject measure. Its value will be one of the criticality categories (e.g., CriticalityEnumeration).

Static Criticality

In some implementations, a measure annotation may include a fixed or static criticality category for the measure.

Semantic Criticality Annotation of Charts

Chart component 142 may retrieve the criticality semantics from the measure metadata in the data model, and, after evaluation, automatically add semantic criticality information to the rendered data points in the chart for the measures.

For fixed criticality thresholds, chart component 142 may, for each data point or measure value in a data set to be rendered, compare the data point value to the threshold values relevant for the specified improvement direction (i.e., maximize, minimize, or target value) to determine which criticality category range (i.e., positive, neutral, critical or negative category) the data point or measure value belongs to.

In example implementations, for improvement direction="target", chart component 142 may determine the criticality of the data point by comparing the data point value to both low and high threshold values. With reference to FIG. 5C, the determined criticality may be positive if the data point value is greater than or equal to AcceptanceRangeLowValue, and lower than or equal to AcceptanceRangeHighValue. The determined criticality may be neutral if the data point value is greater than or equal to ToleranceRangeLowValue and lower than AcceptanceRangeLowValue, or greater than AcceptanceRangeHighValue and lower than or equal to ToleranceRangeHighValue. The determined criticality may be neutral if the data point value is greater than or equal to DeviationRangeLowValue and lower than ToleranceRangeLowValue OR greater than ToleranceRangeHighValue and lower than or equal to DeviationRangeHighValue. The determined criticality may be negative if the value is lower than DeviationRangeLowValue or greater than DeviationRangeHighValue.

In the example implementations, for improvement direction "minimize", chart component 142 may determine the criticality of the data point by comparing the data point value to the high threshold values. With reference to FIG. 5B, the determined criticality may be positive if the data point value is lower than or equal to AcceptanceRangeHighValue. The determined criticality may be neutral if the data point value is greater than AcceptanceRangeHighValue and lower than or equal to ToleranceRangeHighValue. The determined criticality may be critical if the data point value is greater than ToleranceRangeHighValue and lower than or equal to DeviationRangeHighValue. The determined criticality may be negative if the value if the value is greater than DeviationRangeHighValue.

In the example implementations, for improvement direction "maximize", chart component 142 may determine the criticality of the data point by comparing the data point value to the low threshold values. With reference to FIG. 5A, the determined criticality may be positive if the data point value is greater than or equal to AcceptanceRangeLowValue. The determined criticality may be neutral if the data point value is less than AcceptanceRangeLowValue and greater than or equal to ToleranceRangeLowValue. The determined criticality may be critical if the data point value is lower than ToleranceRangeLowValue and greater than or equal to DeviationRangeLowValue. The determined criticality may be negative if the value is lower than DeviationRangeLowValue.

In the example implementations, specification of the thresholds in measure metadata may be optional. One or more thresholds may not be assigned in the measure metadata. For thresholds with unassigned values, chart component 142 may determine default values in order as follows:

For DeviationRange, an omitted LowValue may be assigned the smallest possible number (e.g., minus infinity) as a default value, and an omitted HighValue may be assigned the largest possible number (e.g., plus infinity) as a default value; For ToleranceRange, an omitted LowValue may be assigned the DeviationRangeLowValue as an initial default value, and an omitted HighValue may be assigned the DeviationRangeHighValue as an initial default value; For AcceptanceRange, an omitted LowValue may be assigned the ToleranceRangeLowValue as a default value, and an omitted HighValue may be assigned the ToleranceRangeHighValue as a default value.

For dynamic criticality thresholds, chart component 142 may, for each data point or measure value in a data set to be rendered compare, in the same manner as described above for the case of fixed criticality thresholds, the data point value to the threshold values relevant for the specified improvement direction (i.e., maximize, minimize, or target value) to determine which criticality category range (i.e., positive, neutral, critical or negative) the data point or measure value belongs to.

For calculated-by-reference criticality thresholds, chart component 142 may, for each data point or measure value in a data set to be rendered, determine the criticality of data point or measure value as being the value of the criticality category item defined in the measure annotation.

For static criticality, chart component 142 may, for each data point or measure value in a data set to be rendered, determine the criticality of data point or measure value as being the fixed or static criticality category for the measure specified in the measure annotation.

After the foregoing criticality determinations for the data points or measure values, chart component 142 may annotate the chart with semantic criticality information. In example implementations, chart component 142 may annotate the chart with semantic criticality information, for example, by adding color or other visual markings to the data points according to the determined criticality of the data points.

Example Measure Annotation: Semantic Measure Roles

An example measure annotation in the data model for a semantic measure role may include an assignment of one of an actual role, a projected role, or reference role to the measure. An example measure annotation for a semantic measure role may be as follows:

```
Datastructure: {
...
@SemanticRole: Projected
Item RevenueForecast Type Decimal
...
}.
```

Chart component 142 may retrieve the semantics from the measure metadata in the data model, and automatically use a particular pattern in the chart to visualize a semantic role of a charted measure. The particular pattern may aid a viewer in visually recognizing the semantic role of the charted measure. Chart component 142 may include a pattern-semantic role legend in the chart to aid a viewer in visually recognizing the semantic role of the charted measure.

In example implementations, pre-established rules assigning particular patterns to semantic roles may be used by chart component 142. According to an example rule, for a measure with a semantic role="actual," a solid line may be used, for example, in a line chart, to depict actual measure values, and a solid pattern may be used, for example, in bar or column charts, to depict actual measure values. For a measure with a semantic role="projected," a dashed line may be used, for example, in a line chart, to depict projected measure values, and a dashed pattern may be used, for example, in bar or column charts, to depict projected measure values. For a measure with a semantic role="reference," a dotted line may be used, for example, in a line chart, to depict projected measure values, and an empty pattern may be used, for example, in bar or column charts, to depict projected measure values.

In a chart depicting more than one measure, the particular patterns for the semantic roles of the measures may be automatically assigned and used according to the pre-established rules, for example, when the multiple charted measures are independent (i.e., do not have a semantic relationship).

Example Measure Annotation: Semantic Measure Relations

A semantic measure relation can, for example, be one of two types—a projection relation ("R_Proj."), or a reference relation ("R_Ref.").

If measures "m_A" and "m_P" are related via R_Proj., then both m_A and m_P refer to the same real-world quantity or variable and m_P holds projected values for actual values held in m_A. The two measures m_A and m_P can be located in the same or in different data structures of the same data model or of a different data model that can be linked together.

If measures m_A and "m_R" are related via R_Ref., then both m_A and m_R refer to the same real-world quantity or variable and m_R holds reference values for actual values held in m_A. The two measures m_A and m_R may be located in the same or in different data structures of the same data model or of a different data model that can be linked together.

Either type of semantic measure relation (i.e. a projection relation R_Proj., or reference relation R_Ref.) may be described in the measure annotation of the actual measure item m_A in the data model. The measure annotation of the actual measure item m_A may identify the relation (i.e., R_Proj., or R_Ref.) and fully address the related measure (i.e., m_P or m_R, respectively).

For example, consider a data structure with an actual measure (m_A="Revenue"), a projected measure (m_P="PlannedRevenue"), and a reference measure (m_R="TargetRevenue"). In such a case, an example measure annotation for semantic measure relations may be as follows:

```
Datastructure: {
...
@ProjectedValue: PlannedRevenue
@ReferenceValue: TargetRevenue
Item Revenue Type Decimal
...
}.
```

Chart component 142 may retrieve the semantics from the measure metadata in the data model and automatically add visual representations of the semantics to the rendered data points in the chart for the measures.

Figure 6A:
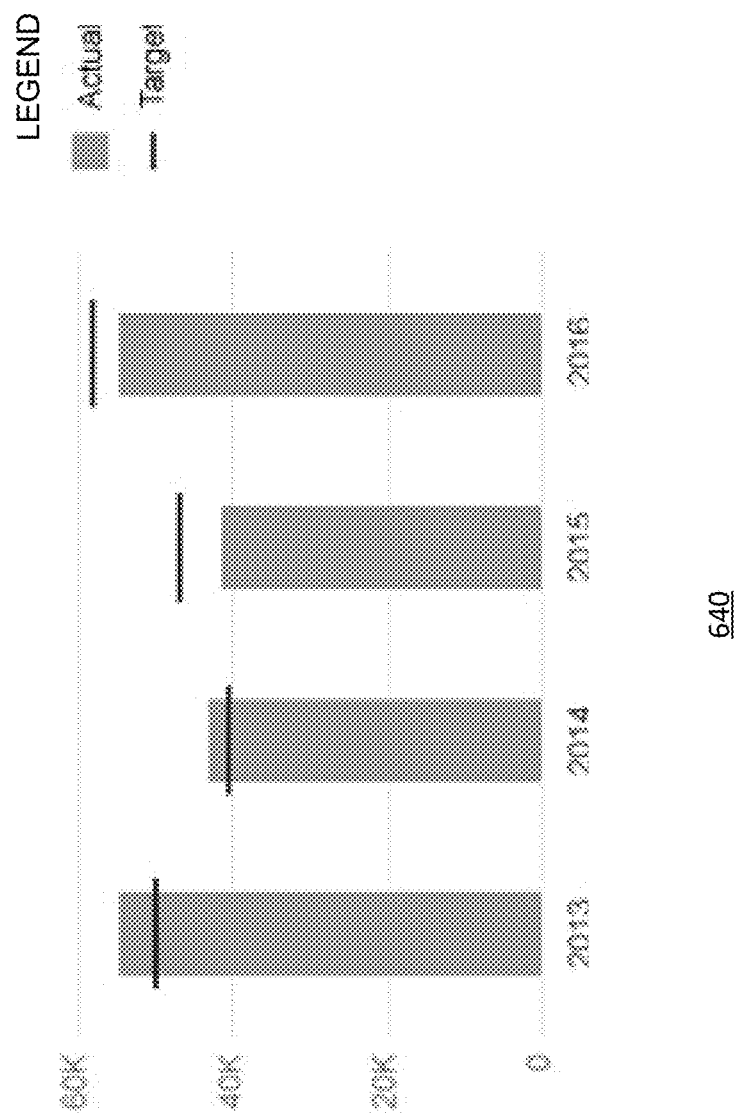
FIG. 6A is an illustration of a bullet chart, which may display a pair of actual-reference measure values, in accordance with the principles of the present disclosure.

If a reference measure is related to an actual measure, values of both the reference measure and the actual measure may be displayed as respective series in a column chart. The two series may be displayed using the same visual colors, but may use different patterns to visually distinguish the actual measure from the reference measure, as shown, for example, in FIG. 4. Chart component 142 may effect similar visualizations for other chart types. For example, FIG. 6A shows a bullet chart, which may display a pair of actual-reference measure values (e.g., actual revenue and target revenue) in accordance with the principles of the present disclosure.

Chart component 142 may effect visualization of the semantic relation between a projected measure and an actual measure in the same manner as the visualization of the semantic relation between the reference measure and the actual measure (described above, for example, with reference to FIG. 4 and FIG. 6A).

Figure 6B:
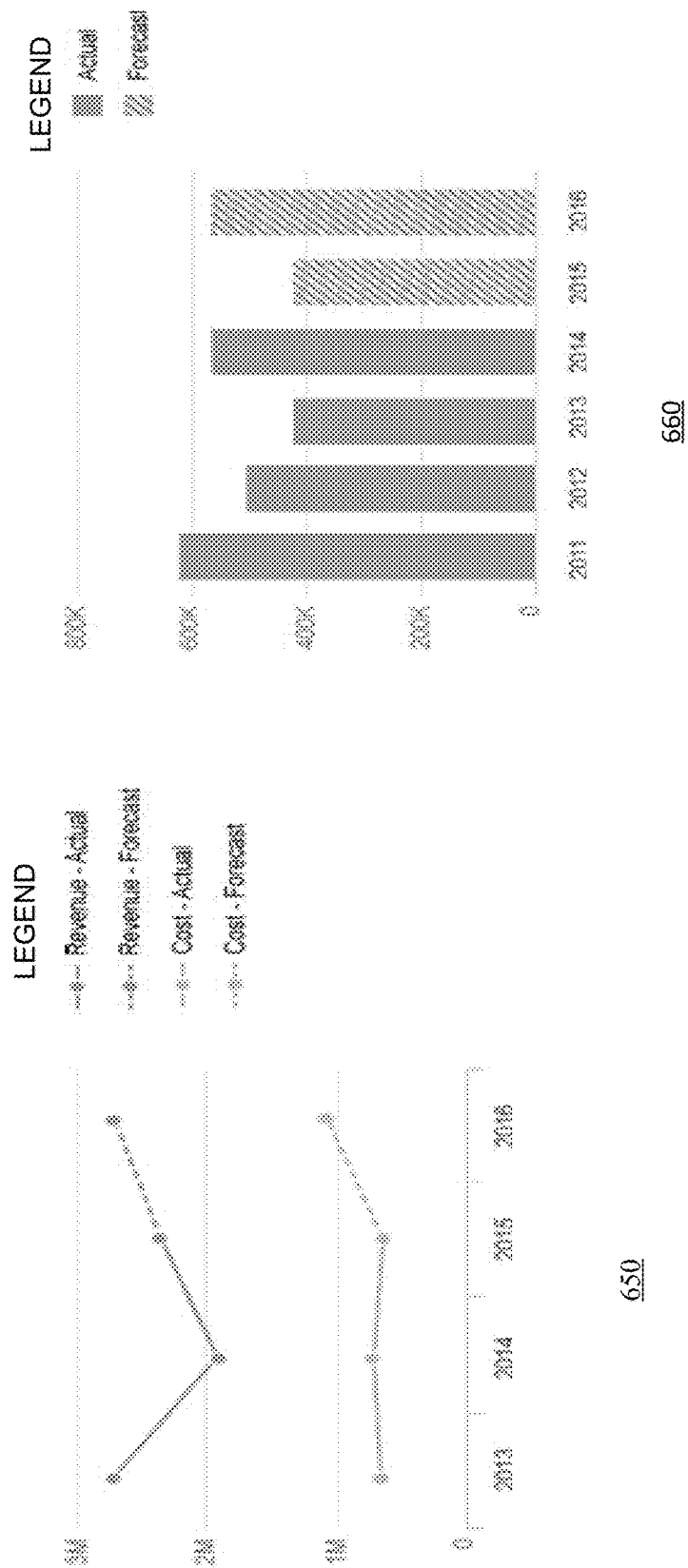
FIG. 6B is an illustration of a chart, which combines a visualization of a related pair of actual measures with visualization of a related pair of projected measures, and a chart which includes a visualization of actual and forecasted measures over time, in accordance with the principles of the present disclosure.

In some implementations, chart component 142 may combine visualization of related actual, projected and reference measures in a single chart. For example, FIG. 6B shows a chart 650, which combines a visualization of a related pair of actual measures (actual Revenue and actual Cost) with visualization of a related pair of projected measures (forecasted Revenue and forecasted Cost), in accordance with the principles of the present disclosure. In FIG. 6B, visualization of actual measures (actual Revenue and actual Cost) for a time period (e.g., years 2013-2015) is combined, for example, with a visualization of projected measures (forecasted Revenue, and forecasted Cost) for another time period (e.g., years 2015-2016). FIG. 6B also shows a chart 660 which includes a visualization of an actual measure and a forecasted measure over time (e.g., actual years 2011-2014, and forecasted years 2014-2016).

Figure 7:
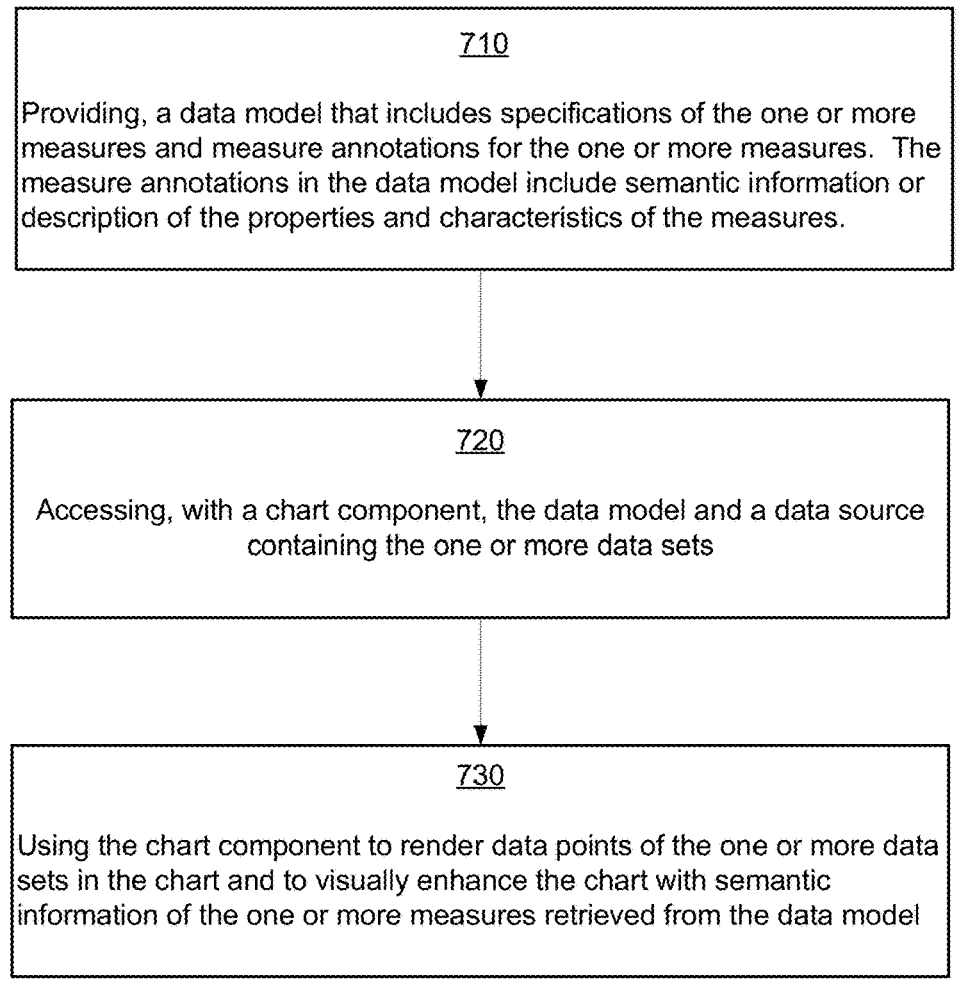
FIG. 7 is an illustration of a computer-implemented method for visually enhancing a chart of one or more data sets with semantic information, in accordance with the principles of the present disclosure.

FIG. 7 shows a computer-implemented method 700 for visually enhancing a chart of one or more data sets with semantic information, in accordance with the principles of the present disclosure. The data points in the data sets are values of one or more measures.

Method 700 includes providing, a data model that includes specifications of the one or more measures and measure annotations for the one or more measures (710). The measure annotations in the data model include semantic information or description of the properties and characteristics of the measures. The measure annotations in the data model are constructed using language constructs of a data modeling language of the data model. Further, the measure annotations in the data model include information on one or more of criticality semantics, semantic roles, and semantic relations of the one or more measures. The criticality semantics provide definitions for categorizing measure values as being in one or more criticality categories.

Method 700 further includes accessing, with a chart component, the data model and a data source containing the one or more data sets (720), and using the chart component to render data points of the one or more data sets in the chart and to visually enhance the chart with semantic information of the one or more measures retrieved from the data model (730).

The chart component, for example, determines criticality categories of the data points rendered in the chart, and enhances the chart to visually depict the criticality categories of the data points rendered in the chart. The chart component visually depicts different criticality categories of the data points rendered in the chart in different graphical patterns and or colors.

The various systems and techniques described herein may be implemented in digital electronic circuitry, or in computer hardware, firmware, or in combinations of thereof. The various techniques may implemented as a computer program product, i.e., a computer program tangibly embodied in a non-transitory machine readable storage device, for execution by, or to control the operation of, data processing apparatus, e.g., a programmable processor, a computer, or multiple computers.

Method steps may be performed by one or more programmable processors executing a computer program. Method steps also may be performed by, and an apparatus may be implemented as, logic circuitry or special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Components of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for visually enhancing a chart of one or more data sets with semantic information, data points in the data sets being values of one or more measures, the system comprising:
 a data model including specifications of the one or more measures and measure annotations for the one or more measures, the measure annotations including semantic information of the measures, wherein the data model includes information on one or more of criticality semantics, semantic roles, and semantic relations of the one or more measures;
 at least one processor; and
 a memory,
 the at least one processor executing instructions stored in the memory to implement a chart component, the chart component rendering the data points of the one or more data sets in a chart and visually enhancing the chart with semantic information of the one or more measures retrieved from the data model, wherein, for calculated-by-reference criticality thresholds, the chart component determines a criticality for each data point or measure value with reference to a reference item specified in the measure annotation for each data point or measure value, and annotates the chart with the determined criticality information.

2. The system of claim 1, wherein the measure annotations in the data model are constructed using language constructs of a data modeling language of the data model.

3. The system of claim 1, wherein the criticality semantics provide definitions for categorizing measure values as being in one or more criticality categories, wherein the chart component determines criticality categories of the data points rendered in the chart, and wherein the chart component enhances the chart to visually depict the criticality categories of the data points rendered in the chart.

4. The system of claim 3, wherein the chart component visually depicts different criticality categories of the data points rendered in the chart in different graphical patterns and or colors.

5. The system of claim 3, wherein the chart component visually enhances the chart by using a dedicated graphical pattern and or color in the chart to depict a semantic role of a charted measure.

6. The system of claim 3, wherein the chart component visually enhances the chart by depicting a semantic relation between two charted measures using respective dedicated graphical patterns and or colors to depict the two charted measures.

7. The system of claim 1, wherein the criticality semantics provide thresholds or category boundary values for one or more criticality categories, wherein the chart component determines the criticality category of a data point rendered in the chart by comparing the data point value with thresholds or category boundary values provided by the criticality semantics.

8. The system of claim 1, wherein the criticality semantics provide fixed thresholds or category boundary values for the one or more criticality categories, and wherein the chart component determines the criticality category of a data point rendered in the chart by comparing the data point value with the fixed thresholds or category boundary values provided by the criticality semantics.

9. The system of claim 1, wherein the criticality semantics provide dynamic thresholds or category boundary values for the one or more criticality categories, and wherein the chart component determines the dynamic thresholds or category boundary values from values of one or more reference measures specified in the criticality semantics.

10. The system of claim 1, wherein, for static criticality categories, the chart component retrieves a criticality specified in the measure annotation for each data point or measure value, and annotates the chart with the retrieved criticality information.

11. A computer-implemented method for visually enhancing a chart of one or more data sets with semantic information, data points in the data sets being values of one or more measures, the method comprising:
providing, a data model that includes specifications of the one or more measures and measure annotations for the one or more measures, the measure annotations including semantic information of the measures, wherein the data model includes information on one or more of criticality semantics, semantic roles, and semantic relations of the one or more measures; and
accessing, with a chart component, the data model and a data source containing the one or more data sets; and
using the chart component to render data points of the one or more data sets in the chart and visually enhance the chart with semantic information of the one or more measures retrieved from the data model, and wherein, for calculated-by-reference criticality thresholds, the chart component determines a criticality for each data point or measure value with reference to a reference item specified in the measure annotation for each data point or measure value, and annotates the chart with the determined criticality information.

12. The computer-implemented method of claim 11, wherein the measure annotations in the data model are constructed using language constructs of a data modeling language of the data model.

13. The computer-implemented method of claim 11, wherein the criticality semantics provide definitions for categorizing measure values as being in one or more criticality categories, wherein the chart component determines criticality categories of the data points rendered in the chart, and wherein the chart component enhances the chart to visually depict the criticality categories of the data points rendered in the chart.

14. The computer-implemented method of claim 13, wherein the chart component visually depicts different criticality categories of the data points rendered in the chart in different graphical patterns and or colors.

15. The computer-implemented method of claim 13, wherein the chart component visually enhances the chart by using a dedicated graphical pattern and or color in the chart to depict a semantic role of a charted measure.

16. The computer-implemented method of claim 13, wherein the chart component visually enhances the chart by depicting a semantic relation between two charted measures using respective dedicated graphical patterns and or colors to depict the two charted measures.

17. The computer-implemented method of claim 11,
wherein when the criticality semantics provide thresholds or category boundary values for the one or more criticality categories the chart component determines the criticality category of a data point rendered in the chart by comparing the data point value with thresholds or category boundary values provided by the criticality semantics,
wherein when the criticality semantics provide fixed thresholds or category boundary values for the one or more criticality categories the chart component determines the criticality category of a data point rendered in the chart by comparing the data point value with the fixed thresholds or category boundary values provided by the criticality semantics,
wherein when the criticality semantics provide dynamic thresholds or category boundary values for the one or more criticality categories the chart component determines the dynamic thresholds or category boundary values from the values of one or more reference measures specified in the criticality semantics, and
wherein, for static criticality categories, the chart component retrieves a criticality specified in the measure annotation for each data point or measure value, and annotates the chart with the retrieved criticality information.

* * * * *